(12) United States Patent
Vandaele

(10) Patent No.: US 7,322,588 B2
(45) Date of Patent: Jan. 29, 2008

(54) MOUNTING ASSEMBLY FOR STEERING SYSTEM OF VEHICLES

(75) Inventor: John J. Vandaele, Ortonville, MI (US)

(73) Assignee: General Motors Corporation, Detroit, MI (US)

( * ) Notice: Subject to any disclaimer, the term of this patent is extended or adjusted under 35 U.S.C. 154(b) by 357 days.

(21) Appl. No.: 10/995,909

(22) Filed: Nov. 24, 2004

(65) Prior Publication Data

US 2006/0108760 A1 May 25, 2006

(51) Int. Cl.
*B62D 3/12* (2006.01)
(52) U.S. Cl. .................. 280/93.515; 384/276
(58) Field of Classification Search ............... 439/921; 280/93.515; 384/9, 276
See application file for complete search history.

(56) References Cited

U.S. PATENT DOCUMENTS

| | | | |
|---|---|---|---|
| 2,945,988 A | 7/1960 | Henry et al. | |
| 2,970,287 A | 1/1961 | Gill | |
| 3,053,593 A * | 9/1962 | Blair et al. | 384/300 |
| 3,869,139 A * | 3/1975 | Gage | 280/93.515 |
| 4,927,367 A | 5/1990 | Salvagno | |
| 4,932,795 A | 6/1990 | Guinn | |
| 5,286,014 A * | 2/1994 | Chakko | 267/293 |
| 5,491,892 A | 2/1996 | Fritz et al. | |
| 5,609,353 A * | 3/1997 | Watson | 280/5.516 |
| 5,806,619 A | 9/1998 | Kleinhoffer et al. | |
| 6,102,416 A * | 8/2000 | Harkrader et al. | 280/93.515 |
| 6,202,300 B1 | 3/2001 | Yuzwalk | |
| 6,264,505 B1 * | 7/2001 | Clary | 439/610 |
| 6,474,941 B2 * | 11/2002 | Dingwell et al. | 415/162 |
| 7,140,778 B2 * | 11/2006 | Hokkirigawa et al. | 384/276 |
| 2005/0104314 A1 * | 5/2005 | Maruyama et al. | 280/93.515 |

* cited by examiner

*Primary Examiner*—Eric Culbreth
*Assistant Examiner*—Leonard McCreary, Jr.

(57) ABSTRACT

A mounting assembly for a steering system of a vehicle includes a tubular boss for operative connection to a steering gear of the steering system and a tubular sleeve disposed within the tubular boss for operative connection to a frame of the vehicle. The mounting assembly also includes a conductive bushing disposed between the tubular sleeve and the tubular boss to allow electrical grounding of the steering gear to the frame of the vehicle.

18 Claims, 2 Drawing Sheets

MOUNTING ASSEMBLY FOR STEERING SYSTEM OF VEHICLES

TECHNICAL FIELD

The present invention relates generally to steering systems for vehicles and, more particularly, to a mounting assembly for a steering system of a vehicle.

BACKGROUND OF THE INVENTION

It is known to provide a steering system for a vehicle to allow a driver to steer wheels of the vehicle. In a vehicle such as a truck, the steering system typically includes a steering wheel, a steering shaft connected to the steering wheel, a steering unit connected to the steering shaft and one or more members such as a tie rods connected to the steering unit and a steering knuckle for the wheel.

A rack and pinion steering system for a vehicle typically includes a rack and pinion steering gear mounted on a body structure and a pair of tie rods between the steering gear and the steering knuckles. In some vehicle applications such as a pick-up truck, the pickup truck is steered in the front by the rack and pinion steering gear. The steering gear is mounted off of a frame crossmember by two bonded rubber bushings that are pressed into a gear housing. The bushings are, then, attached to a frame of the vehicle by two bolts projecting through the crossmember and the bushings. This totally isolates the steering gear from the frame. The tie rods connecting the steering gear to the steering arms are isolated by the rubber bushed suspension components. Additionally, the only other attachment of the steering gear to the vehicle is an intermediate shaft connection. Because of the upper intermediate shaft design, i.e. plastic coated slip yoke, it, too, effectively electrically isolates the steering gear from any electrical ground. However, due to the nature of the steering gear, the location of the steering gear within the vehicle and the proximity of the engine, the steering gear is said to radiate electrical noise induced by an engine ignition system. This radiated noise is picked up by a vehicle radio antenna in the AM spectrum, thus causing noise (static), thereby preventing clean audio for a radio listener of the vehicle.

One attempt to eliminate this noise is to provide a separate grounding strap or other external grounding device to ground the steering gear to the frame of the vehicle. However, such a separate grounding strap would add additional expense as well as assembly labor in making the grounding connection to the frame of the vehicle.

Therefore, it is desirable to provide a mounting assembly for a steering system of a vehicle that allows for grounding of a steering gear. It is also desirable to eliminate static noise caused by a mounting assembly for a steering system of a vehicle. It is further desirable to provide a mounting assembly for a steering system of a vehicle that provides good radio reception, without the need for an additional component to ground the steering gear. Thus, there is a need in the art to provide a mounting assembly for a steering system of a vehicle that meets these desires.

SUMMARY OF THE INVENTION

It is, therefore, one object of the present invention to provide a new mounting assembly for a steering system of a vehicle.

It is another object of the present invention to provide a new mounting assembly for a rack and pinion steering system of a vehicle.

To achieve the foregoing objects, the present invention is a mounting assembly for a steering system of a vehicle. The mounting assembly includes a tubular boss for operative connection to a steering gear of the steering system and a tubular sleeve disposed within the tubular boss for operative connection to a frame of the vehicle. The mounting assembly also includes a conductive bushing disposed between the tubular sleeve and the tubular boss to allow electrical grounding of the steering gear to the frame of the vehicle.

One advantage of the present invention is that a new mounting assembly is provided for a steering system of a vehicle. Another advantage of the present invention is that the mounting assembly electrically grounds a steering gear of a steering system for a vehicle. Yet another advantage of the present invention is that the mounting assembly incorporates conductive bushings that allow for grounding of the steering gear, thereby providing good radio reception. Still another advantage of the present invention is that the mounting assembly has conductive bushings that ground the steering gear without the need for an additional component to ground the steering gear, i.e., a separate grounding strap or similar device. A further advantage of the present invention is that mounting assembly saves money in gear manufacture and assembly labor for a steering system of a vehicle. Yet a further advantage of the present invention is that the mounting assembly grounds the steering gear and may be seamless incorporated into the assembly process.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
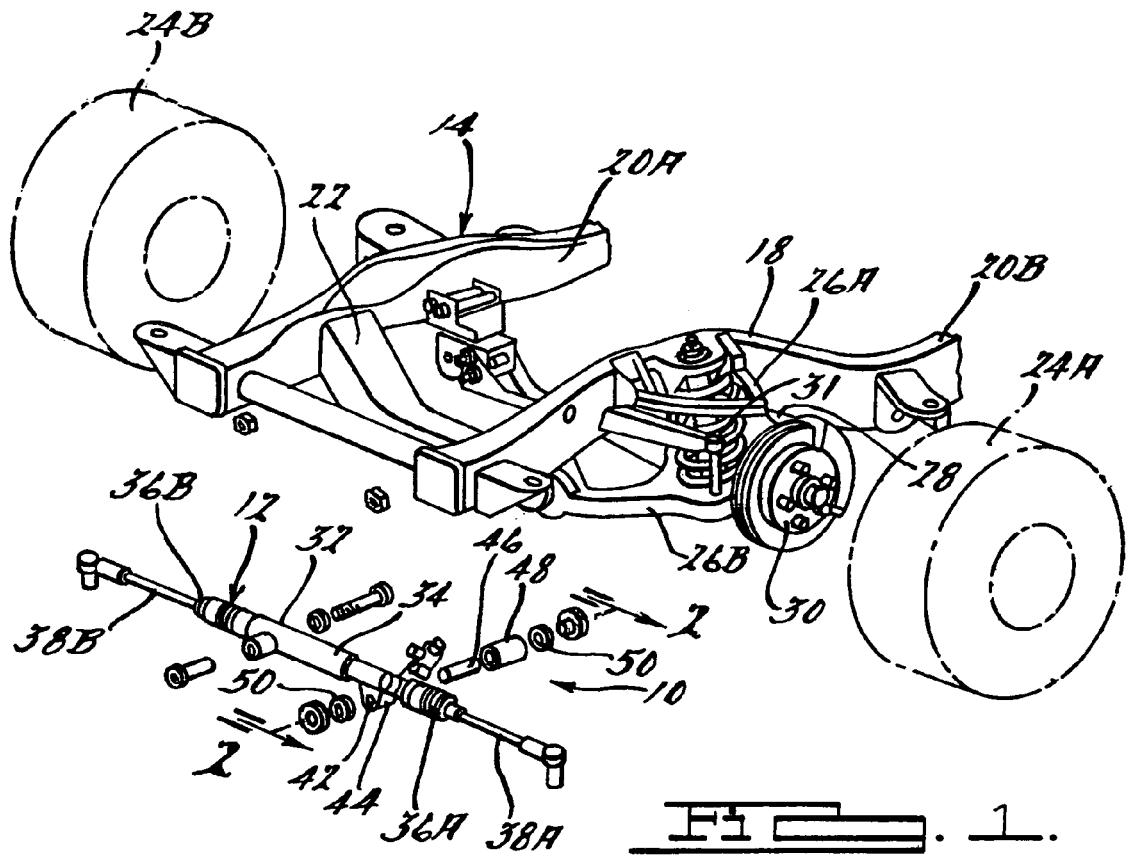
FIG. 1 is an exploded perspective view of a mounting assembly, according to the present invention, illustrated in operational relationship with a steering system of a vehicle.
Figure 3:
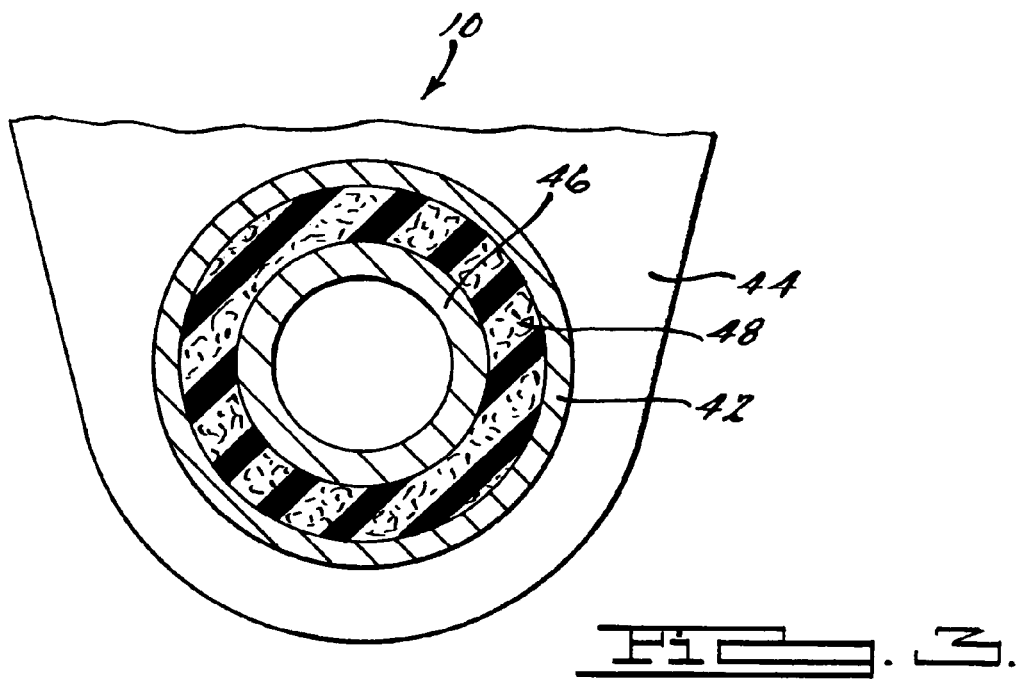
FIG. 3 is a sectional view taken along line 3-3 of FIG. 2.
Figure 2:
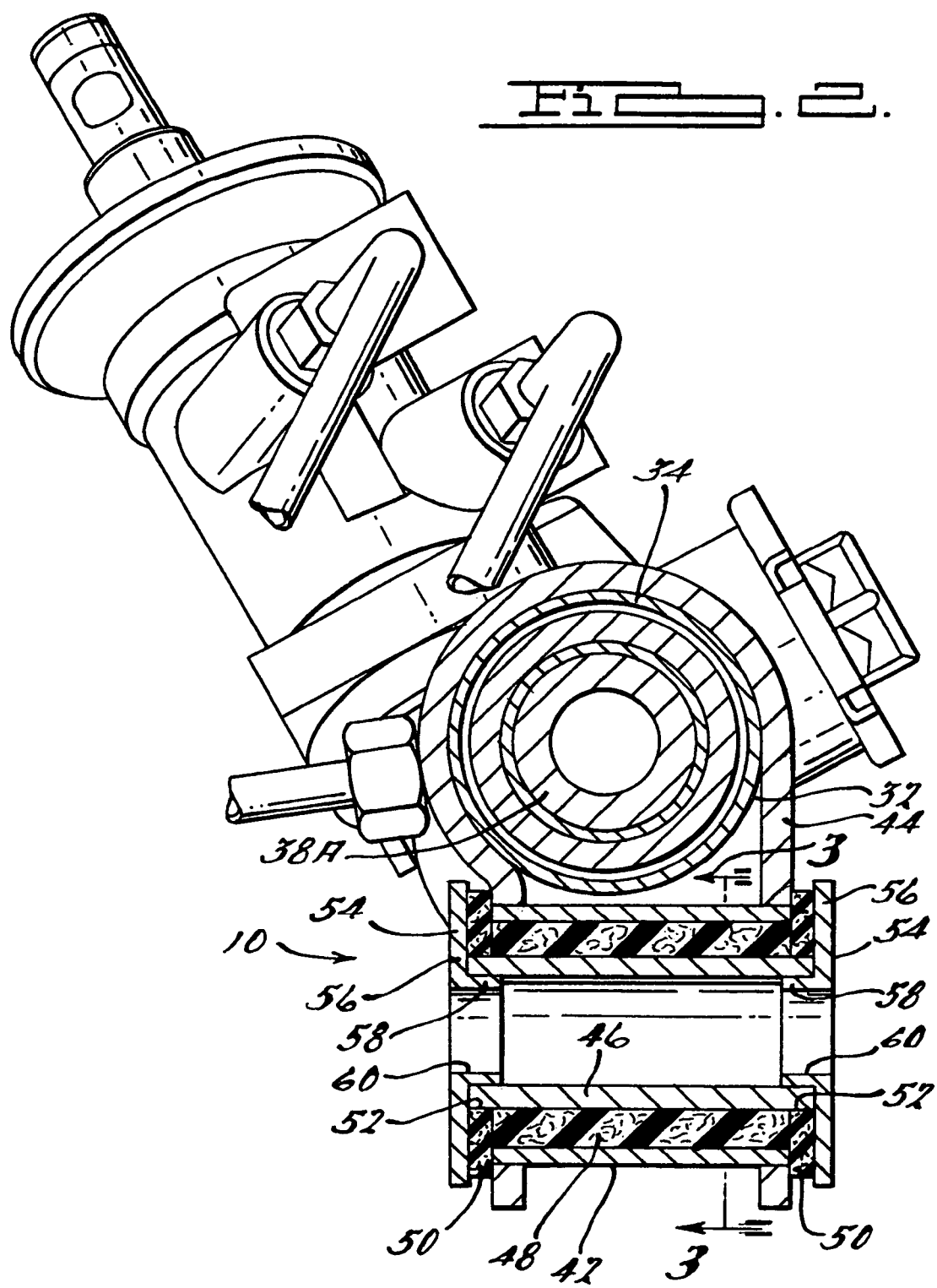
FIG. 2 is a sectional view taken along line 2-2 of FIG. 1.

Referring to the drawings and in particular FIGS. 1 through 3, one embodiment of a mounting assembly 10, according to the present invention, is shown for a steering system, generally indicated at 12, of a vehicle, such as a motor vehicle (partially shown), generally indicated at 14. The vehicle 14 includes a frame 18 having a pair of side rails 20A, 20B generally parallel to a longitudinal centerline of the frame 18 and a rigid cross member 22 between the side rails 20A, 20B. The frame 18 is suspended on a schematically represented pair of steerable dirigible wheels 24A,24B by a front suspension system including, on the left side of the frame 18 looking forward, a pair of control arms 26A,26B supported on the side rail 20A for vertical pivotal movement and a steering knuckle 28 connected to the outboard ends of the control arms 26A,26B for vertical suspension excursions and for pivotal movement about a steering axis. The steerable dirigible wheel 24A is rigidly connected to a hub or rotor 30 rotatably supported on the steering knuckle 28. A spring 31 is disposed between the frame 18 and the lower control arm 26B. It should be appreciated that the front suspension system on the right side (not shown) of the frame 18 is a mirror image of the suspension system on the left side of the frame 18.

Referring to FIG. 1, the steering system 12 includes a rack and pinion steering gear 32. The rack and pinion steering gear 32 includes an elongated tubular housing 34 having a rack bar (not shown) supported therein for horizontal back and forth linear translation perpendicular to the longitudinal centerline of the frame 18. Opposite ends, not shown, of the rack bar protrude beyond corresponding ends of the tubular housing 34 and are shrouded by a pair of flexible boots 36A,36B attached to the housing 34. A pair of tie rods 38A,38B are connected to respective ends of the rack bar inside of the boots 36A,36B and to respective ones of the steering knuckles 28 of the front suspension system. It should be appreciated that the tie rods 38A,38B are offset from the steering axes so that back and forth linear translation of the rack bar induces concurrent pivotal movement of the steering knuckles 28 around the steering axes.

The steering system 12 also includes a pinion gear (not shown) connected to a steering hand wheel (not shown) of the motor vehicle 14 and rotatably supported in the housing 34 that meshes with a rack gear on the rack bar. The pinion gear induces back and forth linear translation of the rack bar concurrent with rotation of the steering hand wheel in conventional fashion. The rack and pinion steering gear 32 is mounted on the cross member 22 of the frame 18 of the body structure 16 by a pair of laterally separated mounting assemblies 10, according to the present invention.

Referring to FIGS. 1 through 3 and describing only one of the mounting assemblies 10, according to the present invention, the mounting assembly 10 includes a tubular boss 42 welded, integral with, or otherwise rigidly attached to the tubular housing 34 below the rack bar by suitable means such as a bracket 44. The tubular boss 42 extends longitudinally and has a generally circular cross-sectional shape. The tubular boss 42 is made of a metal material.

The mounting assembly 10 also includes a tubular sleeve 46 disposed inside of the tubular boss 42. The tubular sleeve 46 extends longitudinally and has a generally circular cross-sectional shape. The tubular sleeve 46 is made of a metal material. It should be appreciated that the tubular sleeve 46 has a longitudinal length greater than the tubular boss 42 for a function to be described.

The mounting assembly 10 includes a conductive bushing 48 disposed inside of the tubular boss 42 between the tubular sleeve 46 and the tubular boss 42. The conductive bushing 48 is generally tubular in shape. The conductive bushing 48 extends longitudinally and has a generally circular cross-sectional shape. The conductive bushing 48 may include a plurality of linear splines (not shown) projecting radially therefrom. The linear splines are resiliently compressed radially between the inside wall of the tubular boss 42 and the outer wall of the tubular sleeve 46. The conductive bushing 48 is made of a conductive elastomeric material. The conductive elastomeric material can be made by impregnating an elastomer with conductive fillers such as carbon, copper flakes, etc. It should be appreciated that the conductive bushing 48 is adhesively bonded to the tubular sleeve 46. It should also be appreciated that the linear splines cooperate in resiliently suspending the tubular boss 42 on the tubular sleeve 46 with directionally variable compliance perpendicular to the longitudinal centerline of the tubular boss 42.

The mounting assembly 10 also includes an annular washer 50 at each end of the tubular boss 42. Each washer 50 is generally circular in cross-sectional shape. Each washer 50 has a diameter greater than a diameter of the tubular boss 42 for a function to be described. Each washer 50 also has an aperture 52 extending therethrough to allow the washer 50 also to be disposed about the tubular sleeve 46. The washer 50 is made of a conductive elastomeric material. The conductive elastomeric material can be made by impregnating an elastomer with conductive fillers such as carbon, copper flakes, etc. It should be appreciated that each washer 50 is disposed over the tubular sleeve 46 and abuts a longitudinal end of the tubular boss 42.

The mounting assembly 10 further includes an end cap 54 at each end of the tubular sleeve 46. Each end cap 54 has a head portion 56 extending radially with a generally circular cross-sectional shape. The head portion 56 has a diameter greater than a diameter of the washer 50. Each end cap 54 has an annular shaft portion 58 extending longitudinally from the head portion 56 to form an aperture 60 extending therethrough for a function to be described. The shaft portion 58 is disposed through the aperture 52 of the washer 50 and into the hollow interior of the tubular sleeve 46. The end cap 54 is made of a metal material. It should be appreciated that the ends of the conductive bushing 48 are captured between the washers 50 and the end caps 54 on the tubular sleeve 46.

The mounting assembly 10 includes a bolt (not shown) that traverses the tubular sleeve 46 and the washers 50 and end caps 54 and an aperture (not shown) in a vertical panel of the cross member 22 and cooperates with a nut (not shown) on the other side in rigidly clamping the tubular sleeve 46 of the mounting assembly 10 to the frame 18 of the body structure 16. It should be appreciated that the conductive bushing 48 grounds the steering gear 32, thereby eliminating the need for a separate grounding scheme to attenuate RFI radiated from the housing 34.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A mounting assembly for a steering system of a vehicle comprising:
   a tubular boss for operative connection to a steering gear of the steering system;
   a tubular sleeve disposed within said tubular boss for operative connection to a frame of the vehicle; and
   an electrically conductive bushing disposed between said tubular sleeve and said tubular boss to allow electrical grounding of the steering gear to the frame of the vehicle, wherein said conductive bushing comprises an elastomeric material and an electrically conductive filler material which impregnates said elastomeric material such that said filler material provides electrical conduction across the elastomeric material between said boss and said sleeve.

2. A mounting assembly as set forth in claim 1 wherein said conductive bushing is tubular.

3. A mounting assembly as set forth in claim 1 further comprising an annular washer at each end of said conductive bushing.

4. A mounting assembly as set forth in claim 3 wherein said annular washer has an aperture extending therethrough to allow said tubular sleeve to extend through said washer.

5. A mounting assembly as set forth in claim 3 wherein said annular washer is made of an electrically conductive material.

6. A mounting assembly as set forth in claim 3 wherein said annular washer has a diameter greater than a diameter of said tubular boss.

7. A mounting assembly as set forth in claim 3 further comprising an end cap at each end of said tubular sleeve.

8. A mounting assembly as set forth in claim 7 wherein said end cap has a shaft portion extending axially to be disposed in said tubular sleeve and a head portion extending radially from said shaft portion to abut said washer.

9. A mounting assembly as set forth in claim 7 wherein said end cap is made of a metal material.

10. A mounting assembly as set forth in claim 1 wherein said tubular sleeve has a longitudinal length greater than a longitudinal length of said tubular boss.

11. A mounting assembly as set forth in claim 1 wherein said tubular sleeve is made of a metal material.

12. A mounting assembly as set forth in claim 1 wherein said tubular boss is made of a metal material.

13. A mounting assembly for a steering system of a vehicle comprising:
   a tubular boss for operative connection to a steering gear of the steering system;
   a tubular sleeve disposed within said tubular boss for operative connection to a frame of the vehicle;
   an annular washer at each end of said tubular sleeve;
   an end cap at each end of said tubular sleeve; and
   a tubular electrically conductive bushing disposed between said tubular sleeve and said tubular boss and each said washer to allow electrical grounding of the steering gear to the frame of the vehicle, wherein said conductive bushing comprises an elastomeric material and an electrically conductive filler material which impregnates said elastmeric material such that said filler material provides electrical conduction across the elastomeric material between said boss and said sleeve.

14. A mounting assembly as set forth in claim 13 wherein said annular washer has an aperture extending therethrough to allow said tubular sleeve to extend through said washer.

15. A mounting assembly as set forth in claim 13 wherein said annular washer has a diameter greater than a diameter of said tubular boss.

16. A mounting assembly as set forth in claim 13 wherein said end cap has a shaft portion extending axially to be disposed in said tubular sleeve and a head portion extending radially from said shaft portion to abut said washer.

17. A mounting assembly as set forth in claim 13 wherein said tubular sleeve has a longitudinal length greater than a longitudinal length of said tubular boss.

18. A steering system for a vehicle comprising:
   a steering gear;
   a tubular boss operatively connected to said steering gear;
   a tubular sleeve disposed within said tubular boss for operative connection to a frame of the vehicle; and
   an electrically conductive bushing disposed between said tubular sleeve and said tubular boss to allow electrical grounding of said steering gear to the frame of the vehicle, wherein said conductive bushing comprises an elastomeric material and an electrically conductive filler material which impregnates said elastomeric material such that said filler material provides electrical conduction across the elastomeric material between said boss and said sleeve.

* * * * *